United States Patent
Augustine et al.

(10) Patent No.: US 10,568,265 B2
(45) Date of Patent: Feb. 25, 2020

(54) DRAPER BELT ROLLER SUPPORT

(71) Applicant: Deere and Company, Moline, IL (US)

(72) Inventors: Brent A. Augustine, Davenport, IA (US); Anthony M. Hasenour, Port Byron, IL (US); Alex Brimeyer, Bettendorf, IA (US); Joshua R. Pierson, East Moline, IA (US); Daniel S. Hoffman, Bettendorf, IA (US); Nicholis R. Fitzpatrick, Davenport, IA (US); Rodrigo Carlesso, Tres de Maio (BR)

(73) Assignee: Deere & Company, Moline, IL (US)

( * ) Notice: Subject to any disclaimer, the term of this patent is extended or adjusted under 35 U.S.C. 154(b) by 184 days.

(21) Appl. No.: 15/799,987

(22) Filed: Oct. 31, 2017

(65) Prior Publication Data
US 2019/0124843 A1 May 2, 2019

(51) Int. Cl.
| | |
|---|---|
| *A01D 61/00* | (2006.01) |
| *A01D 57/20* | (2006.01) |
| *A01D 41/14* | (2006.01) |
| *A01D 61/02* | (2006.01) |
| *A01D 34/04* | (2006.01) |

(52) U.S. Cl.
CPC ........... *A01D 61/008* (2013.01); *A01D 57/20* (2013.01); *A01D 34/04* (2013.01); *A01D 41/14* (2013.01); *A01D 61/002* (2013.01); *A01D 61/02* (2013.01)

(58) Field of Classification Search
CPC ...... A01D 75/20; A01D 61/002; A01D 41/14; A01D 61/02; A01D 43/06; A01D 61/008; A01D 57/20; A01D 34/04; A01F 12/10; B65G 15/42; B65G 15/52; B65G 15/30
See application file for complete search history.

(56) References Cited

U.S. PATENT DOCUMENTS

| | | | | |
|---|---|---|---|---|
| 1,862,101 A | * | 6/1932 | Pax | A01D 61/002 |
| | | | | 198/523 |
| 2,347,365 A | * | 4/1944 | Paradise | A01D 57/20 |
| | | | | 198/699 |
| 2,685,958 A | * | 8/1954 | White, Jr. | E02F 7/00 |
| | | | | 198/836.1 |
| 5,459,986 A | * | 10/1995 | Talbot | A01D 61/002 |
| | | | | 56/14.5 |
| 5,918,456 A | | 7/1999 | Darcis | |

(Continued)

FOREIGN PATENT DOCUMENTS

EP     2420128     2/2012

OTHER PUBLICATIONS

European search report for 18202592.4-1006 dated Feb. 12, 2019.
(Continued)

*Primary Examiner* — Arpad Fabian-Kovacs
(74) *Attorney, Agent, or Firm* — Rathe Lindenbaum LLP

(57) ABSTRACT

A roller support for draper belt supporting rollers of a harvester header may include a base, a first post extending from the base in a direction to support a first roller, a second post extending from the base in the direction to support a second roller, an arm extending from the base in the direction between the first post and the second post and a wear structure supported by and immovable relative to the arm. The wear structure may have a wear surface facing downwardly.

19 Claims, 4 Drawing Sheets

(56) References Cited

U.S. PATENT DOCUMENTS

| | | | |
|---|---|---|---|
| 7,640,720 B1* | 1/2010 | Lovett | A01D 57/20 56/181 |
| 7,788,891 B2 | 9/2010 | Puryk et al. | |
| 7,908,836 B1* | 3/2011 | Rayfield | A01D 61/002 56/181 |
| 7,971,418 B2* | 7/2011 | Conrad | A01D 41/148 56/162 |
| 8,065,865 B1* | 11/2011 | Dow | A01D 57/20 56/181 |
| 8,191,344 B2* | 6/2012 | Sauerwein | A01D 57/20 198/836.1 |
| 8,205,421 B2* | 6/2012 | Sauerwein | A01D 41/14 56/181 |
| 8,291,686 B1* | 10/2012 | Cormier | A01D 61/002 56/181 |
| 8,322,520 B2* | 12/2012 | Dow | A01D 61/002 198/837 |
| 8,484,939 B1* | 7/2013 | Cormier | A01D 43/06 56/158 |
| 8,511,050 B1* | 8/2013 | Cormier | A01D 41/14 56/158 |
| 2002/0129591 A1* | 9/2002 | Patterson | A01D 57/20 56/158 |
| 2007/0193243 A1* | 8/2007 | Schmidt | A01D 41/14 56/181 |
| 2007/0204589 A1* | 9/2007 | Coers | A01D 57/20 56/208 |
| 2008/0092508 A1* | 4/2008 | Talbot | A01D 57/20 56/181 |
| 2008/0202090 A1* | 8/2008 | Lovett | A01D 57/20 56/208 |
| 2008/0271426 A1* | 11/2008 | Lohrentz | A01D 41/14 56/153 |
| 2009/0007533 A1 | 1/2009 | Lovett | |
| 2012/0042617 A1* | 2/2012 | Dow | A01D 61/002 56/14.5 |
| 2012/0233974 A1* | 9/2012 | Cormier | A01D 61/002 56/181 |
| 2014/0059995 A1* | 3/2014 | Cormier | A01D 43/06 56/181 |
| 2014/0165526 A1* | 6/2014 | Leys | A01D 41/14 56/181 |
| 2014/0196427 A1* | 7/2014 | Fuechtling | A01D 41/14 56/181 |
| 2016/0360699 A1 | 12/2016 | Allochis | |
| 2017/0258009 A1* | 9/2017 | Heyns | A01D 34/04 |
| 2018/0279553 A1* | 10/2018 | Peters | B65G 15/52 |
| 2018/0279554 A1* | 10/2018 | Peters | A01D 61/02 |
| 2018/0368323 A1* | 12/2018 | Martens | A01D 75/00 |
| 2019/0014720 A1* | 1/2019 | Schropp | A01D 41/12 |
| 2019/0104684 A1* | 4/2019 | Hasenour | A01D 61/02 |

OTHER PUBLICATIONS

John Deere Parts Catalogue 11650/grid 50/p. 36, Draper Drive Float Arm, LH (110177), 635FD Flex Draper Platform (S.N. 115099-) (South America Edition) (Jan. 2016).

\* cited by examiner

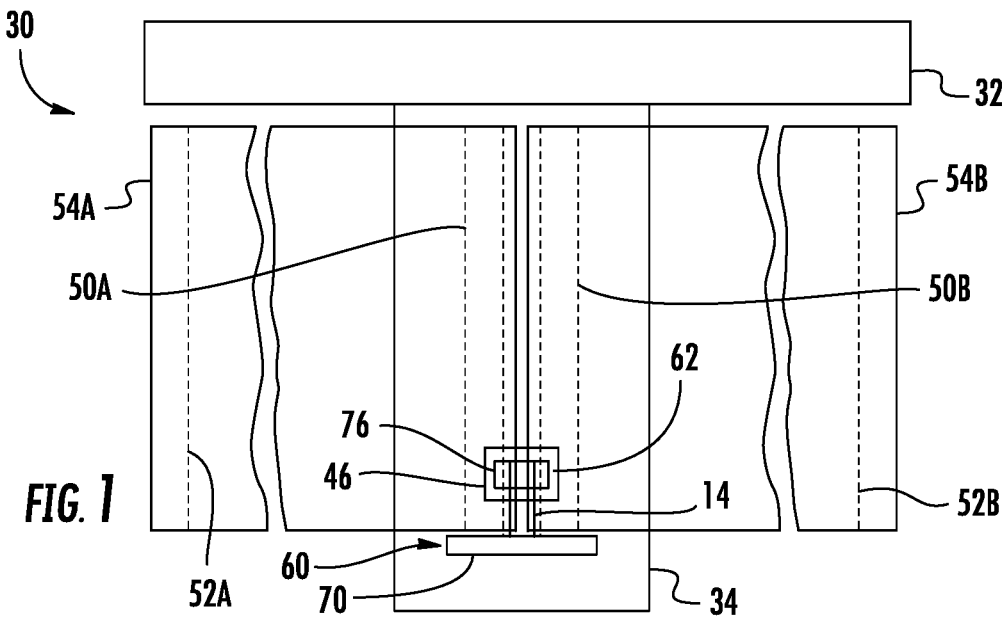

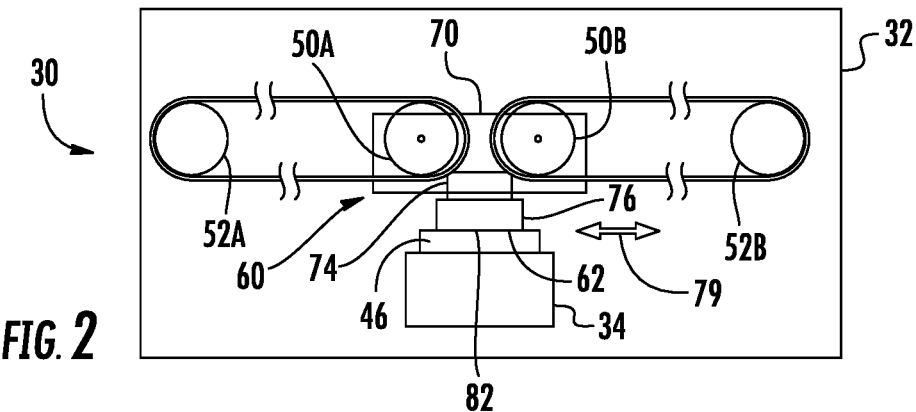

100 ↴

104 ↴
SUPPORT A FIRST DRAPER BELT AND A SECOND DRAPER BELT WITH THE FIRST ROLLER AND A SECOND ROLLER, RESPECTIVELY

SUPPORT THE FIRST AND SECOND ROLLERS WITH A ROLLER SUPPORT COMPRISING: A BASE; A FIRST POST EXTENDING FROM THE BASE IN A DIRECTION TO SUPPORT THE FIRST ROLLER; A SECOND POST EXTENDING FROM THE BASE IN THE DIRECTION TO SUPPORT THE SECOND ROLLER; AN ARM EXTENDING FROM THE BASE IN THE DIRECTION BETWEEN THE FIRST POST AND THE SECOND POST; AND A WEAR STRUCTURE SUPPORTED BY AND IMMOVABLE RELATIVE TO THE ARM, THE WEAR STRUCTURE HAVING A WEAR SURFACE FACING DOWNWARDLY AND SLIDABLY ABUTTING A WEAR STRUCTURE SUPPORTED BY A FLOAT ARM OF THE HARVESTER HEADER

DRAPER BELT ROLLER SUPPORT

BACKGROUND

Draper belts are used on harvester heads to convey severed crop material transversely across the head to a feeder housing that further conveys the crop material into the harvester for handling, such as threshing and cleaning. The draper belts are supported by rollers, such as drive rollers or idler rollers on the header of the harvester. The rollers are supported by roller supports that accommodate shifting of the header and/or draper belts when encountering different terrains.

BRIEF DESCRIPTION OF THE DRAWINGS

FIG. 1 is a top view illustrating portions of an example harvester header.

FIG. 2 is a front view illustrating portions of the example harvester header of FIG. 1.

FIG. 3 is a flow diagram of an example method for supporting draper belts on a harvester header.

Figure 4:
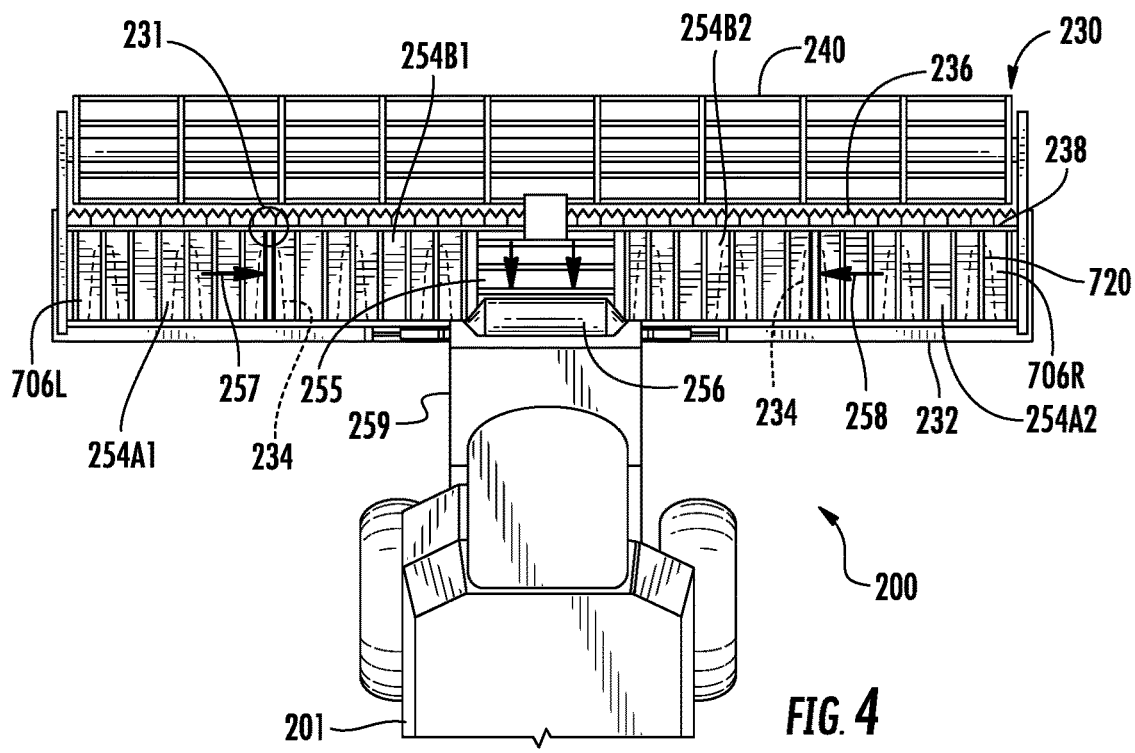
FIG. 4 is a top view illustrating portions of an example harvester having an example harvester header.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Harvesters often encounter large variations in the underlying terrain of the field. To accommodate such variations, such harvesters are provided with harvester headers that are flexible. Relative movement of different portions of the harvester heads when flexing may create wear on certain parts.

Disclosed herein are example harvester headers that movably support draper belts relative to other portions of the harvester header, such as a float arm. The disclosed example harvester headers utilize (1) a first wear structure removably mounted to the float arm and (2) a roller support that supports draper belt supporting rollers and that provides a second wear structure that abuts and is slidable relative to the first wear surface. The removable wear structure and the roller support provide a less complex and lower-cost bearing arrangement that allows the rollers supporting the draper belts and the float arm to move relative to one another.

Disclosed herein is an example harvester header that may comprise a first draper belt, a first roller about which the first draper belt wraps, a second draper belt, a second roller about which the second draper belt wraps, a float arm, a first wear structure removably mounted to the float arm and providing a first wear surface facing upwardly and a roller support supporting the first roller and the second roller. The roller support may comprise a base, an arm extending from the base towards the float arm and a second wear structure supported by and immovable relative to the arm. The second wear structure has a second wear surface facing downwardly such that the second wear surface is in abutting contact with and is slidable relative to the first wear surface.

Disclosed herein is an example roller support for draper belt supporting rollers of a harvester header. The example roller support may comprise a base, a first post extending from the base in a direction to support a first roller, a second post extending from the base in the direction to support a second roller, an arm extending from the base in the direction between the first post and the second post and a wear structure supported by and immovable relative to the arm. The wear structure may have a wear surface facing downwardly.

Disclosed herein is an example method for supporting draper belts on a harvester head. The method may comprise supporting a first draper belt and a second draper belt with the first roller and a second roller, respectively, and supporting the first and second rollers with a roller support. The roller support may comprise a base, a first post extending from the base in a direction to support the first roller, a second post extending from the base in the direction to support the second roller, an arm extending from the base in the direction between the first post and the second post and a wear structure supported by and immovable relative to the arm. The wear structure has a wear surface facing downwardly and slidably abutting a wear structure supported by a float arm of the harvester header.

FIGS. 1 and 2 schematically illustrate portions of an example harvester head or header 30. FIG. 1 is a top view of harvester header 30 with portions removed or transparently shown for purpose of illustration. FIG. 2 is a front view of the harvester head 30 with portions removed for purposes of illustration. Harvester header 30 is for use with a harvester that separates and cleans grain or other crop from other plant material. For example, in one implementation, harvester head 30 is for use with a harvester that threshes and cleans grain, such as wheat, soybeans, barley and the like.

Harvester header 30 utilizes a less complex and lower-cost bearing arrangement that allows the rollers supporting draper belts and a float arm of the header to move relative to one another to accommodate terrain changes. Harvester header 30 comprises frame 32, float arm 34, wear structure 46, rollers 50A, 50B (collectively referred to as rollers 50), rollers 52A, 52B (collectively referred to as rollers 52), draper belts 54A, 54B (collectively referred to as draper belts 54) and roller support 60. Frame 32 comprises a base or platform for harvester header 30. Frame 32 facilitates mounting or connection of harvester header 30 to a harvester. Frame 32 supports float arm 34.

Float arm 34 extends forwardly from frame 32, underlying draper belts 54. Float arm 34 supports a cutter bar, knives and guards (not shown) at a forward end of harvester header 30. In some implementations, float arm 34 and is movable relative to frame 32, facilitating movement of the cutter bar, knives and guards relative to frame 32 and relative to draper belts 52. Although the portion of header 30 illustrated depicts a single float arm 34, it should be appreciated that harvester header 30 may comprise multiple float arms. Likewise, in some implementations, harvester header 30 may comprise multiple additional draper belts, rollers and roller supports.

Wear structure 46 comprises a structure removably mounted to float arm 34 which provides a wear surface 62 that faces in a generally upward direction, opposite to and in abutting contact with portions of roller support 60. Wear surface 62 wears over time as a result of abrasion due to the relative sliding movement of wear structure 46 and roller support 60. Wear structure 46, being removable from float arm 34, facilitates easy and low-cost replacement of wear structure 46 when such wear has become excessive.

Rollers 50 cooperate with rollers 52 to support and drive draper belts 52 in a transverse direction along harvester header 30. Rollers 50 extend proximate one another, whereas rollers 52 support outer ends of draper belts 54. Rollers 50 are supported by roller support 60. In one implementation, rollers 50 may comprise idler rollers. In another implementation, rollers 50 may be operably coupled to a source of torque to drive rollers 50 and drive draper belts 54. In one implementation, one of rollers 50 may comprise a drive roller while the other of rollers 50 comprises an idler roller.

Draper belts 54 comprise webs of material for the conveyance of crops or crop material. In one implementation, draper belts 54 are driven in opposite directions, moving the crop material towards one another or moving crop material away from one another. In yet another implementation, draper belt 54 are driven in the same direction, moving the crop material either to the left or to the right. In some implementations, draper belt 54 comprise external cleats to facilitate conveyance of crop material. In some implementations, draper belt 54 may comprise belt guides in the form of a projection or rib that is received within corresponding grooves formed in rollers 50 and 52.

Roller support 60 rotatably supports rollers 50 while at the same time uplifting, propping up and movably supporting rollers 50 and draper belts 54 for sliding movement or relative movement with respect to float arm 34. Roller support 60 comprises base 70, arm 74 and wear structure 76. Base 70 comprise a structure from which arm 74 projects. In one implementation, base 70 is cantilevered or otherwise supported by frame 32, such that frame 32 and the remainder of roller support 60 may move or slide in the direction indicated by arrows 79 relative to wear structure 46 and float arm 34. For example, in one implementation base 70 may be cantilevered or otherwise supported by a roller carriage (not shown).

Arm 74 extends from base 70 towards float arm 34. Arm 74 extends from base 70 in a rearward direction, towards frame 32 and towards the harvester to which harvester header 30 is mounted or extends. In one implementation, arm 74 is welded, fastened or bonded to base 70. In another implementation, arm 74 and base 70 are integrally formed as a single homogenous unitary body.

Wear structure 76 comprise a structure supported by and immovable relative to arm 74. Because wear structure 76 is immovable relative to arm 74, during operation of harvester header 30 or use of harvester header 30, wear structure 76 does not move relative to arm 74. As a result, there are no junctions or interfaces were relative sliding movement may occur which might otherwise create locations, other than at the interface formed between wear structure 76 and wear surface 46, where wear or abrasion may occur. In one implementation, wear structure 76 is welded, fastened or bonded to arm 74 so as to be immovable relative to arm 74. In another implementation, wear structure 76 and arm 74 are integrally formed as a single homogenous unitary body. In one implementation, wear structure 76, arm 74 and base 70 are integrally formed as a single homogenous unitary body, forming a single unitary piece or component, reducing complexity and parts inventory demands.

Wear structure 76 has a wear surface 82 which faces in a generally downward direction. Wear surface 82 is in abutting contact with and is slidable relative to wear surface 62. In one implementation, wear surface 82 is formed from a material or is configured so as to wear at a slower rate as compared to wear surface 62 during abrasion between surfaces 62 and 82. As a result, such wear may be biased towards wear structure 46 which may be more easily accessed, more easily replaced and/or which may have a lower cost as compared to roller support 60.

In one implementation, wear surface 82 may have a chrome oxide coating. At the same time, wear surface 62 may be formed from a "softer" material or coating. For example, wear surface 62 may be formed from an iron boride ($Fe_2B$). In yet other implementations, other materials may be utilized for surfaces 62 and 82, wherein wear between the surfaces is biased are driven towards the lower cost, more easily accessible and/or more easily replaced wear member, such as wear member 46.

FIG. 3 is a flow diagram of an example method 100 for supporting draper belt in a harvester header. Method 100 provides a less complex and lower-cost bearing arrangement for supporting the rollers supporting draper belts and a float arm of the header to move relative to one another to accommodate terrain changes. Although method 100 is described in the context of being carried out or with harvester header 30, it should be appreciated that method 100 may be likewise carried out with other harvester headers disclosed hereafter or other similar harvester headers.

As indicated by block 104, a first draper belt 54A and a second draper belt 54B are supported by a first roller 50A and a second roller 50B, respectively.

As indicated by block 108, the first and second rollers 50 are supported by a roller support 60. The roller support 60 may comprise a base, a first post extending from the base in a direction to support a first roller, a second post extending from the base in the direction to support a second roller, an arm extending from the base in the direction between the first post and the second post and a wear structure supported by and immovable relative to the arm. The wear structure may have a wear surface facing downwardly. The wear surface is slidably abutting a wear structure supported by a float arm of the harvester header.

Figure 5:
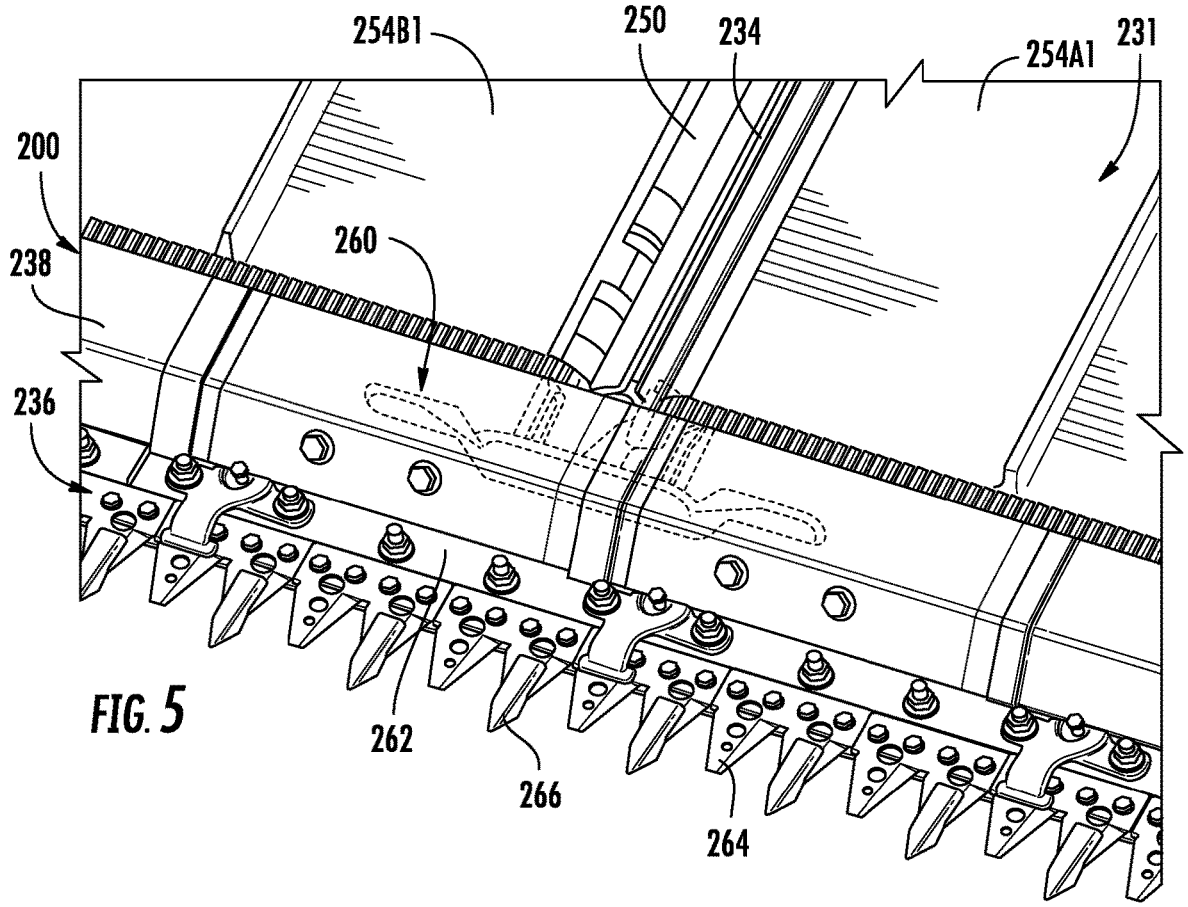
FIG. 5 is an enlarged fragmentary perspective view illustrating a portion of the harvester header of FIG. 4, wherein portions are broken away or are shown transparently to illustrate a location of an example roller support and portions of an example roller supported by the roller support.

FIGS. 4 and 5 illustrate portions of an example harvester 200 having an example harvester header 230. FIG. 4 is a top view illustrating portions of the example harvester 200. FIG. 5 is a large fragmentary view of the portion 231 of harvester header 230 identified in FIG. 4. As shown by FIG. 4, harvester header 230 comprises frame 232, float arms 234 (shown in broken lines), cutter assembly 236, crop ramps 238, gathering reels 240, rollers 250 (one of which is shown in FIG. 5), rollers drapers or draper belts 254A1, 254B1, 254A2 and 254B2 (collectively referred to as draper belts 254), central draper belt 255 feed drum 256 and roller supports 260 (one of which is shown in FIG. 5). Frame 232 forms the rear exterior of header 230 and supports remaining components of header 230. Frame 230 is configured to be releasably mounted to a combine harvester chassis 201.

Gathering reels 240 gather and direct the crop towards cutter assembly 236. Cutter assembly 236 cuts and/or severs the crop or plant from soil. As shown by FIG. 5, cutter assembly 236 comprises a cutter bar 262, reciprocating knives 264 and guards 266. Cutter bar 262 is supported by float arm 234. Cutter bar 262 supports knives 264 and guards 266. Knives 264 pass between and through guards 266. Guards 266 guide reciprocating movement of knives 264. Crop ramps 238 comprise plates or panels that extend rearwardly from knives 2642 draper belts 254. Crop ramps 238 guide the crop back up onto draper belts 254.

Draper belts 254 comprise carpets, platforms or belts which are transversely driven so as to carry the severed plants or crops to central draper 255. Draper belts 254A1 and 254B1 carry the severed crops in the direction indicated by arrow 257 while draper belts 254A2 and 25462 carry severed crops in the direction indicated by arrow 258. Central draper belt 255 conveys the severed crop material to feed drum 256. Feed drum 256 is rotatably driven so as to move the severed crop material rearwardly into a feeder house 259 of harvester 201 for threshing.

Figure 6:
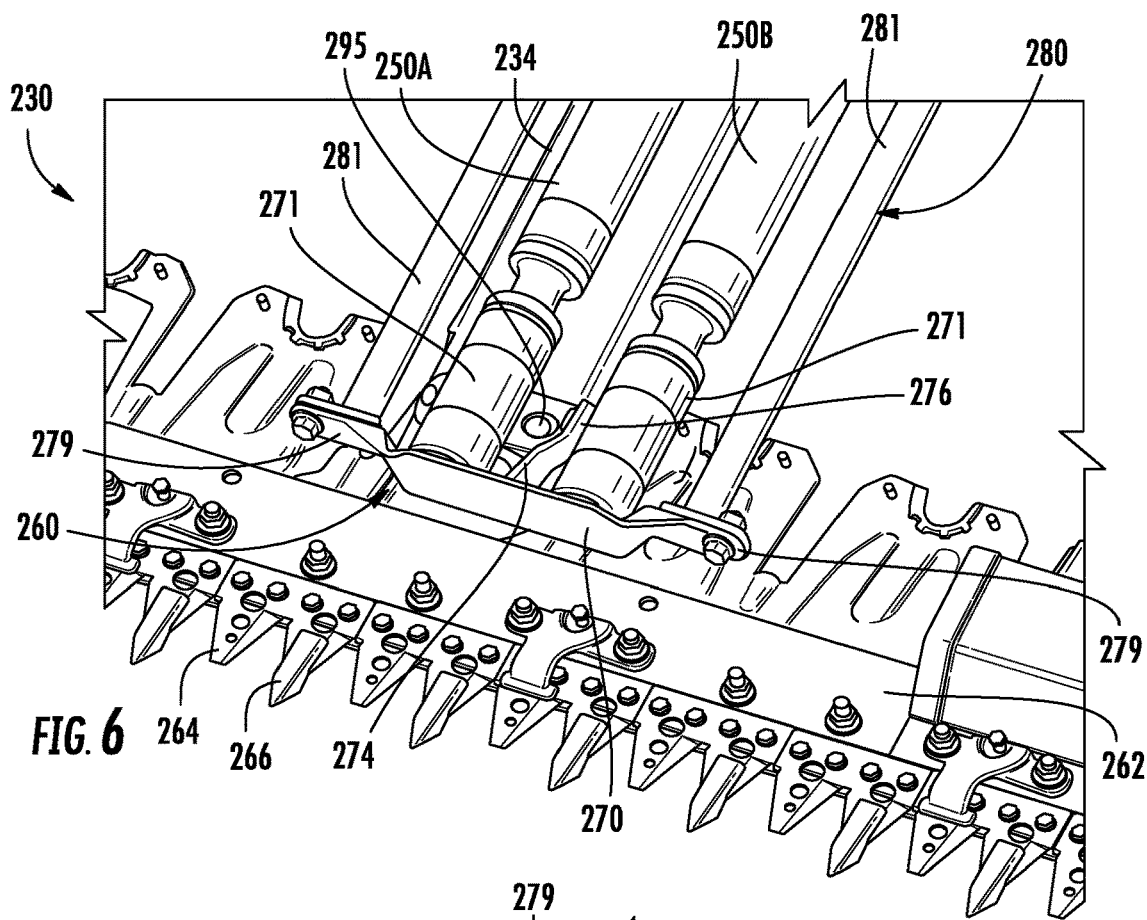
FIG. 6 is an enlarged front perspective view of the portion of the harvester header of FIG. 5 with crop ramps and draper belts omitted to illustrate the example roller support supporting draper belt rollers.
Figure 7:
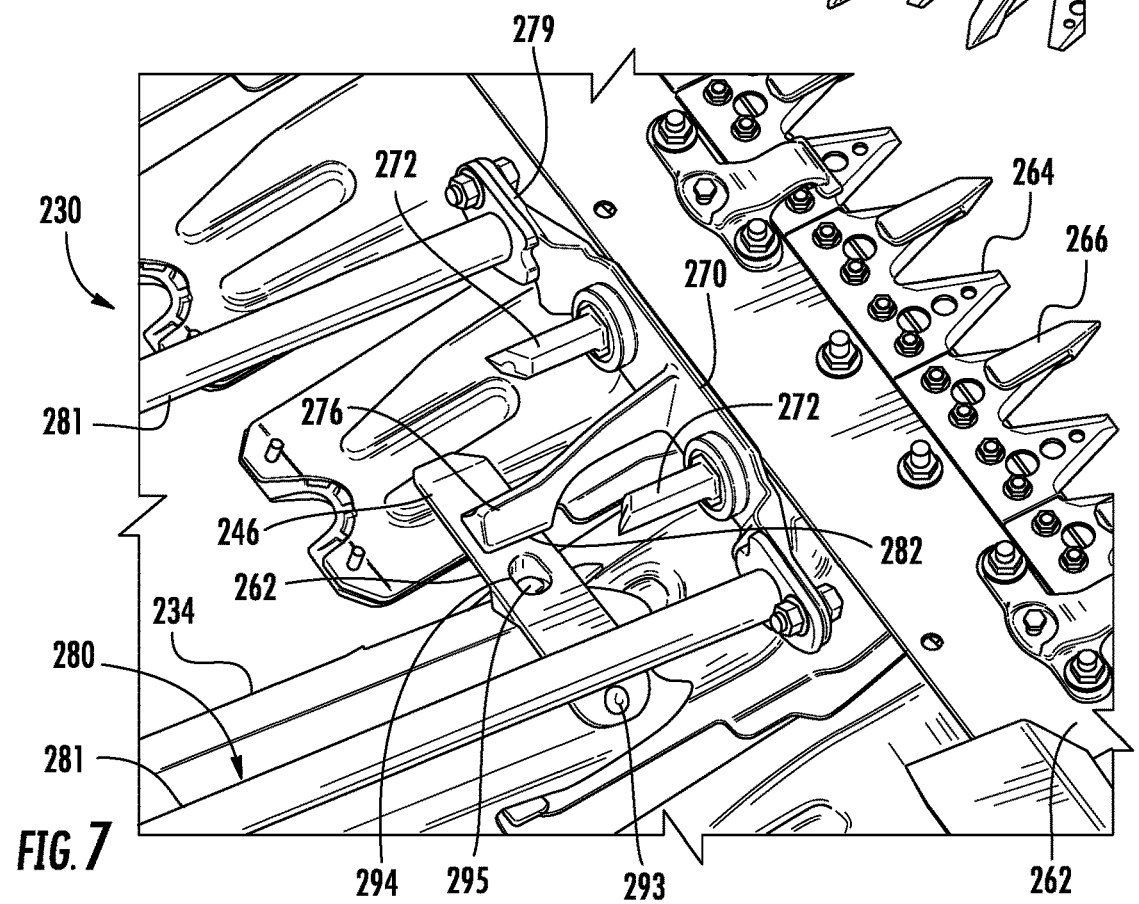
FIG. 7 is an enlarged rear perspective view of the portion of the harvester header of FIG. 6 with the draper belt rollers omitted to further illustrate the example roller support.
Figure 8:
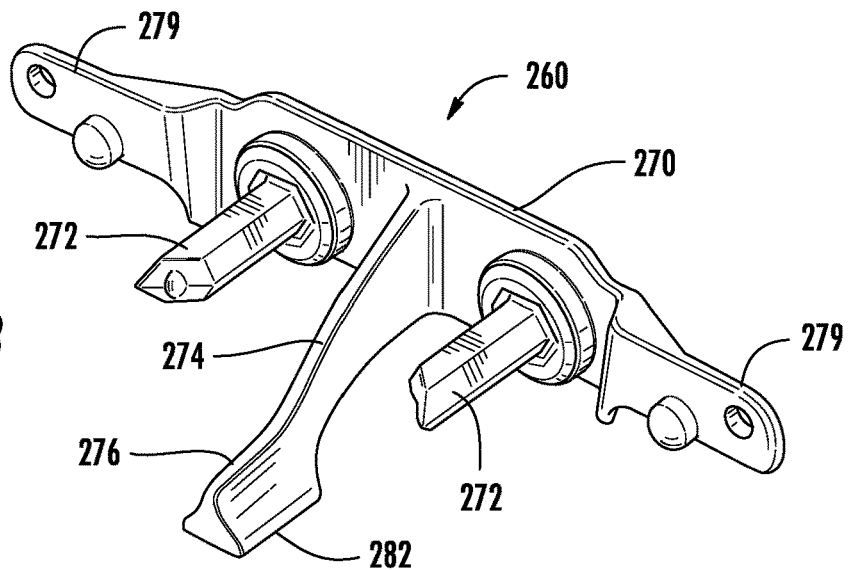
FIG. 8 is a front top perspective view of the example roller support of FIGS. 5-7.
Figure 9:
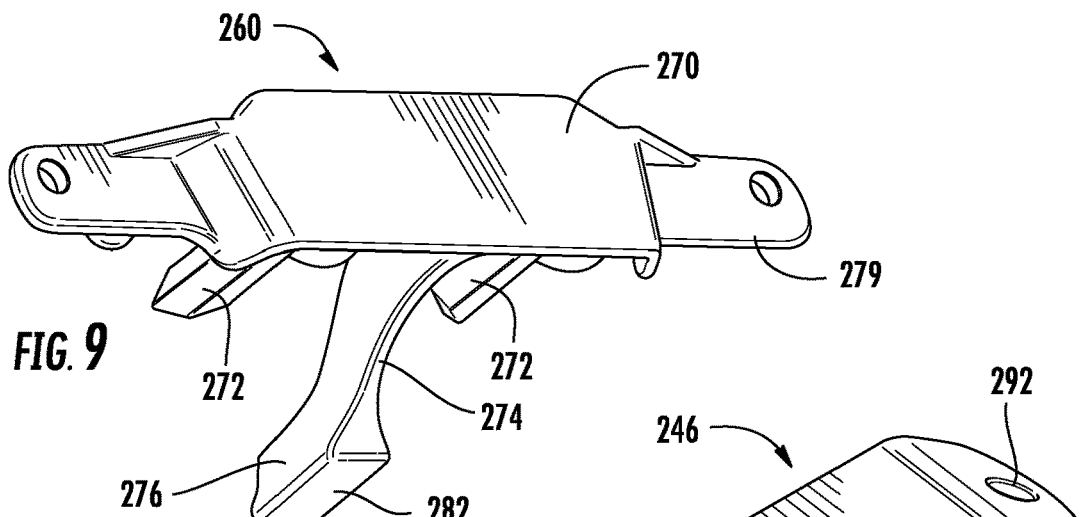
FIG. 9 is a rear bottom perspective view of the example roller support of FIG. 8.

Roller support 260 rotatably supports rollers 250 while the same time uplifting, propping up and movably supporting rollers 250 and draper belts 254 for sliding movement or relative movement with respect to float arm 234 FIG. 5 illustrates roller support 260 in broken lines to identify the general location of roller support 260 below crop ramps 238 while omitting the connection between roller support 260 and rollers 250 for purposes of illustration. FIGS. 6 and 7 illustrate roller support 260 and its relationship with the remaining components of harvester header 230 in more detail. FIGS. 8 and 9 illustrate roller support 260 independent of harvester header 230.

As shown by FIGS. 8 and 9, roller support 260 comprises base 270, posts 272, arm 274 and wear structure 276. Base 270 comprises a structure from which arm 274 projects. Base 270 projects from opposite sides of arm 274, supporting posts 272 on opposite sides of arm 274.

In the example illustrated, base 270 further comprises outermost wings 279 for being mounted to supporting structures that support roller support 260. As will be described hereafter, outermost wings 279 facilitate mounting of roller support 260 to a roller carriage. As shown by FIGS. 6 and 7, roller support 260 is supported by roller carriage 280. Roller carriage 280 comprises a pair of rods 281. Each of rods 281 is mounted at a first end to frame 32 and a second end to a corresponding one of wings 279. Rods 281 cantilever support 260 above a wear member 246 removably mounted to float arm 234.

Posts 272 project from base 270 on opposite sides of arm 274. Posts 272 project from base 270 in a same direction as that of arm 274. As shown by FIG. 6, posts 272 support rollers 250. In the example illustrated posts 272 are integrally formed as a single unitary body with base 270 such a post 272 are rigid and stationary. Posts 272 are received by cylindrical bearings 271 that rotatably support the remainder of their respective rollers 250.

Arm 274 extends from base 270 towards float arm 234 (shown in FIG. 7). Arm 274 extends from base 270 in a rearward direction, towards frame 232 and towards the harvester to which harvester header 230 is mounted or extends. In the example illustrated, arm 274 and base 270 are integrally formed as a single homogenous unitary body. In other implementations, arm 274 is welded, fastened or bonded to base 270.

Wear structure 276 comprises a structure supported by and immovable relative to arm 274. Because wear structure 276 is immovable relative to arm 274, during operation of harvester header 230 or use of harvester header 230, wear structure 276 does not move relative to arm 274. As a result, there are no junctions or interfaces were relative sliding movement may occur which might otherwise create locations, other than at the interface formed between wear structure 276 and wear member 246, where wear or abrasion may occur. In the example illustrated, wear structure 276 and arm 274 are integrally formed as a single homogenous unitary body. In the example illustrated, wear structure 276, arm 274 and base 270 are integrally formed as a single homogenous unitary body, forming a single unitary piece or component, reducing complexity and parts inventory demands. In other implementations, Wear structure 276 is welded, fastened or bonded to arm 274 so as to be immovable relative to arm 274.

Wear structure 276 has a wear surface 282 (shown in FIG. 9) which faces in a generally downward direction. As shown by FIGS. 6 and 7, wear surface 282 is in abutting contact with and slidable relative to wear surface 262 of wear structure 246. In one implementation, wear surface 282 is formed from a material or is configured so as to wear at a slower rate as compared to wear surface 262 during abrasion between surfaces 262 and 282. As a result, such wear may be biased towards wear structure 246 which may be more easily accessed, more easily replaced and/or which may have a lower cost as compared to roller support 260.

In one implementation, wear surface 282 may have a chrome oxide coating. At the same time, wear surface 262 may be formed from a "softer" material or coating. For example, wear surface 262 may be formed from an iron boride ($Fe_2B$). In yet other implementations, other materials may be utilized for surfaces 262 and 282, wherein wear between the surfaces is biased or driven towards the lower cost, more easily accessible and/or more easily replaced wear member, such as wear member 246.

Figure 10:
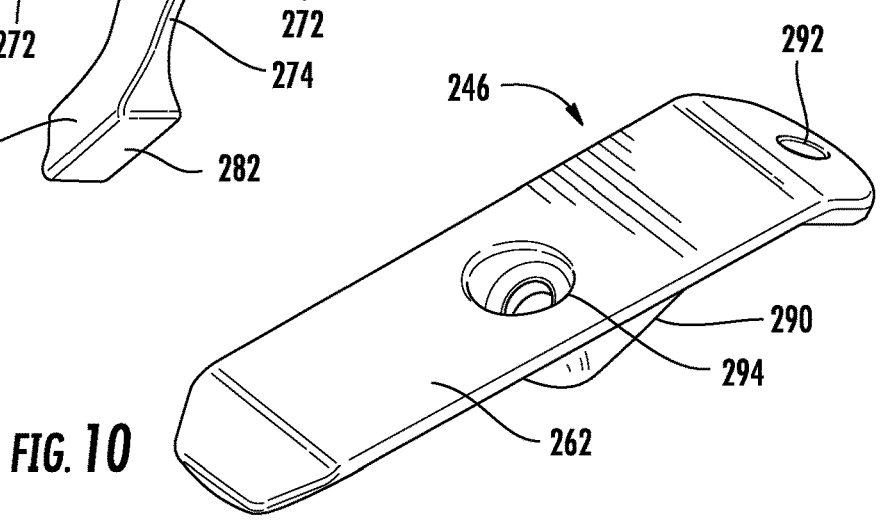
FIG. 10 is a top perspective view of an example wear structure of the harvester head of FIGS. 6-7.
Figure 11:
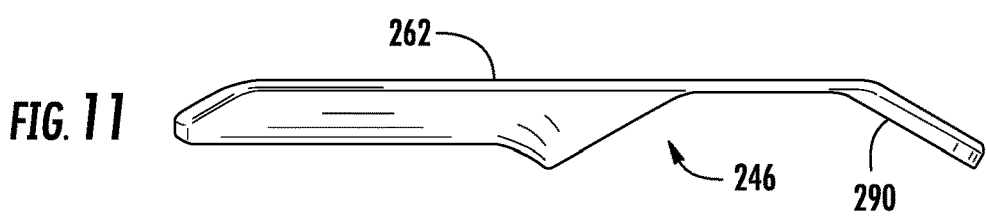
FIG. 11 is a side view of the example wear structure of 10.

FIGS. 10 and 11 illustrate wear structure 246 in greater detail. As shown by FIGS. 10 and 11, wear structure 246 comprises an elongate bar having a lower profile that matches and mates with the upper surface of float arm 234. In the example illustrated, wear structure 246 comprises a downwardly facing cavity 290 that receives the convex upper surface of float arm 234 so as to mate with the upper surface of float arm 234 is shown in FIG. 7. The lower profile of wear structure 246 wraps about the convex upper surface of float arm 234.

As further shown by FIG. 10, wear structure 246 has a substantially elongate flat wear surface 262. To facilitate mounting of wear structure 246 to float arm 234, wear structure 246 comprises a first opening 292 in a downwardly angled portion of wear structure 246 for securing wear structure 246 to float arm 234 with a fastener 293. Wear structure 246 further comprises a second countersunk bore 294, wherein the head of a fastener 295 mounting wear structure 246 to float arm 234 is recessed below wear surface 262. As further shown by FIG. 7, wear structure 246 is asymmetrically mounted to float arm 234 such that wear surface 262 is cantilevered to one side of float arm 234 so as to extend across the transverse midpoint between carriage rods 281 and between posts 272, beneath arm 274 and wear structure 276.

As discussed above, wear surface 262 wears at a faster rate as compared to wear surface 282. As a result, wear structure 246 wears out well before wear structure 276 of roller support 260. Fasteners 293 and 295 facilitate easy removal and replacement of wear structure 246. Such removal and replacement is further facilitated in that wear structure 246 does not support any other structures and is not mounted to any other structures other than float arm 234. As a result, the number of parts to be removed to replace wear structure 246 is small.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A harvester header comprising:
a first draper belt;
a first roller about which the first draper belt wraps;
a second draper belt;
a second roller about which the second draper belt wraps;
a float arm;
a first wear structure removably mounted to the float arm and providing a first wear surface facing upwardly;
a roller support supporting the first roller and the second roller, the roller support comprising:
a base;
an arm extending from the base towards the float arm; and
a second wear structure supported by and immovable relative to the arm, the second wear structure having a second wear surface facing downwardly, the second wear surface being in abutting contact with and slidable relative to the first wear surface.

2. The harvester header of claim 1, wherein the second wear structure and the arm are integrally formed as a single unitary body.

3. The harvester header of claim 2, wherein the arm and the base are integrally formed as a single unitary body.

4. The harvester header of claim 3, wherein the roller support further comprises:
a first post extending from the base towards the float arm on a first side of the arm, the first post supporting the first roller; and
a second post extending from the base towards the float arm on a second side of the arm, opposite the first side, the second post supporting the second roller.

5. The harvester header of claim 4, wherein the first post and the second post are integrally formed as a single unitary body with the base.

6. The harvester header of claim 5, wherein the first wear structure is cantilevered from one side of the float arm.

7. The harvester header of claim 5, wherein the first wear surface comprises iron boride $Fe_2B$.

8. The harvester header of claim 7, wherein the second wear surface comprises a chrome oxide spray coating.

9. The harvester header of claim 1, wherein the roller support further comprises:
a first post extending from the base towards the float arm on a first side of the arm, the first post supporting the first roller; and
a second post extending from the base towards the float arm on a second side of the arm, opposite the first side, the second post supporting the second roller.

10. The harvester header of claim 9, wherein the first post and the second post are integrally formed as a single unitary body with the base.

11. The harvester header of claim 1, wherein the first wear structure is cantilevered from one side of the float arm.

12. The harvester header of claim 1, wherein the first wear surface comprises iron boride $Fe_2B$.

13. The harvester header of claim 12, wherein the second wear surface comprises a chrome oxide coating.

14. The harvester header of claim 1 further comprising first and second support rods extending from the base.

15. A roller support for draper belt supporting rollers of a harvester header, the roller support comprising:
a base;
a first post extending from the base in a direction to support a first roller;
a second post extending from the base in the direction to support a second roller, wherein the first post and the second post are integrally formed as a single unitary body with the base;
an arm extending from the base in the direction between the first post and the second post; and
a wear structure supported by and immovable relative to the arm, the wear structure having a wear surface facing downwardly.

16. The roller support of claim 15, wherein the wear structure and the arm are integrally formed as a single unitary body.

17. The roller support of claim 15, wherein the wear surface comprises a chrome oxide coating.

18. A method for supporting a draper belt of a harvester header, the method comprising:
supporting a first draper belt and a second draper belt with the first roller and a second roller, respectively;
supporting the first and second rollers with a roller support comprising:
a base;
a first post extending from the base in a direction to support the first roller;
a second post extending from the base in the direction to support the second roller;
an arm extending from the base in the direction between the first post and the second post; and
a wear structure supported by and immovable relative to the arm, the wear structure having a wear surface facing downwardly and slidably abutting a wear structure supported by a float arm of the harvester header.

19. The method of claim 18, wherein the wear surface comprises a chrome oxide coating and wherein the wear structure has a layer of iron boride $Fe_2B$ in abutment with the chrome oxide coating.

* * * * *